United States Patent
Amaral et al.

(10) Patent No.: US 11,806,982 B1
(45) Date of Patent: Nov. 7, 2023

(54) MULTILAYER LAMINATE PANEL

(71) Applicant: FRONTWAVE—ENGENHARIA E CONSULTADORIA, S.A., Borba (PT)

(72) Inventors: Pedro Amaral, Borba (PT); Joel Pinheiro, Borba (PT)

(73) Assignee: Frontwave—Engenharia E Consultadoria, S.A., Borba (PT)

( * ) Notice: Subject to any disclaimer, the term of this patent is extended or adjusted under 35 U.S.C. 154(b) by 0 days.

(21) Appl. No.: 15/750,578

(22) PCT Filed: Aug. 4, 2016

(86) PCT No.: PCT/EP2016/068680
§ 371 (c)(1),
(2) Date: Feb. 6, 2018

(87) PCT Pub. No.: WO2017/021505
PCT Pub. Date: Feb. 9, 2017

(30) Foreign Application Priority Data

Aug. 6, 2015 (PT) .......................................... 108756

(51) Int. Cl.
*B32B 5/02* (2006.01)
*B32B 9/00* (2006.01)
(Continued)

(52) U.S. Cl.
CPC .............. *B32B 9/002* (2013.01); *B32B 5/024* (2013.01); *B32B 9/02* (2013.01); *B32B 9/047* (2013.01);
(Continued)

(58) Field of Classification Search
CPC .... B32B 9/00; B32B 9/02; B32B 9/04; B32B 5/02
(Continued)

(56) References Cited

U.S. PATENT DOCUMENTS 3,950,202 A * 4/1976 Hodges ................... B28D 1/00
156/154
5,042,215 A * 8/1991 Cremer ................. E04F 13/144
52/509
(Continued)

FOREIGN PATENT DOCUMENTS

CA 2840850 A1 2/2015
CN 201406811 Y 2/2010
(Continued)

OTHER PUBLICATIONS

Machine_English_Translation_DE10300779_A1; Production of a laminated plate; Jul. 22, 2004; EPO; whole document (Year: 2004).*
(Continued)

*Primary Examiner* — Tahseen Khan
(74) *Attorney, Agent, or Firm* — Procopio, Cory, Hargreaves & Savitch LLP

(57) ABSTRACT

A multilayer laminate panel comprising a first layer of a stone-based material and a second layer of a dissimilar material of lower density, which are interposed by one or more layers of resin-impregnated fibers, is provided. The dissimilar material comprises cork or a derivative of cork, and the thickness of the layer of stone-based material is from about 2 mm to about 50 mm. A process for the production of the panel is also provided. The panel finds use as a coating in a variety of interior and exterior applications. A panel comprising fixing means and a process for attaching the fixing means to the panel are also provided.

20 Claims, 4 Drawing Sheets

(51) Int. Cl.
*B32B 9/04* (2006.01)
*B32B 9/02* (2006.01)

(52) U.S. Cl.
CPC ... *B32B 2260/021* (2013.01); *B32B 2260/046* (2013.01); *B32B 2262/101* (2013.01); *B32B 2307/102* (2013.01); *B32B 2307/304* (2013.01); *B32B 2307/516* (2013.01); *B32B 2307/518* (2013.01); *B32B 2307/54* (2013.01); *B32B 2307/546* (2013.01); *B32B 2307/558* (2013.01); *B32B 2307/72* (2013.01); *B32B 2317/02* (2013.01); *B32B 2419/04* (2013.01); *B32B 2451/00* (2013.01); *B32B 2607/02* (2013.01)

(58) Field of Classification Search
USPC ........................................................ 428/213
See application file for complete search history.

(56) References Cited

U.S. PATENT DOCUMENTS

| | | | | |
|---|---|---|---|---|
| 2006/0154015 | A1* | 7/2006 | Miller | E04F 15/085 428/50 |
| 2013/0196789 | A1* | 8/2013 | Kim | A63B 37/0082 473/373 |
| 2015/0375473 | A1* | 12/2015 | Miralles Torla | B32B 38/08 428/220 |
| 2018/0154606 | A1* | 6/2018 | Francis | B32B 5/024 |

FOREIGN PATENT DOCUMENTS

| | | | | |
|---|---|---|---|---|
| DE | 10300779 A1 | * | 7/2004 | ............ B32B 5/24 |
| DE | 10300779 A1 | | 7/2004 | |
| FR | 1440792 A | | 6/1966 | |
| WO | 1991/009733 A1 | | 7/1991 | |
| WO | 2005/102696 A1 | | 11/2005 | |
| WO | 2006/093367 A1 | | 9/2006 | |
| WO | 2011/115514 A2 | | 9/2011 | |
| WO | WO-2011115514 A2 | * | 9/2011 | ............ B32B 5/02 |
| WO | 2012/000893 A1 | | 1/2012 | |
| WO | 2013/190414 A1 | | 12/2013 | |
| WO | 2014/118410 A1 | | 8/2014 | |
| WO | WO-2014118410 A1 | * | 8/2014 | ........... B32B 38/08 |

OTHER PUBLICATIONS

International Search Report and Written Opinion for PCT/EP2016/068680, dated Jan. 18, 2017, in 23 pages.
Anonymous. "Cork: MakeItFrom.com." Aug. 6, 2016. Retrieved from http://www.makeitfrom.com/material-properties/cork on Nov. 10, 2016.
Amorim by Amorim. "Flexural Strength at Yield Mechanical Properties of the Core Material Density." Sep. 19, 2009. Retrieved from http://www.matrix-composites.co.uk/prod-data-sheet/cork/mds-gama-corecork.pdf on Nov. 17, 2016.
Search Report for PT Application No. 108756 dated Mar. 22, 2016, 11 pages.
Office Action dated Mar. 24, 2021 from counterpart CN Patent Application No. 2016800590843, 12 pages.

* cited by examiner

MULTILAYER LAMINATE PANEL

FIELD

The present disclosure relates to multilayer laminate panels, methods for their production and their use in a number of applications, including as stone material coatings for interior and exterior use, for example in buildings for walls, floors and ceilings, and in furniture and decorative elements.

BACKGROUND

The industry of coatings and coverings with stone materials and derivative products has been increasing its interest and its demand for lighter and more functional systems allowing, among other things, less intrusive support structures and also seeking to provide these materials with improved thermal and acoustic insulation properties. On the other hand, the current costs associated with the transport of these materials (particularly given the weight limits imposed for most used means of transport), prevent a greater capacity of stone materials utilization worldwide. Thus, whilst the use of thin stone pieces has become technically feasible, it is difficult to implement given the fragility exhibited by stone materials and derivatives. Currently the industrial processing required for this thickness reduction, as well as the difficulties inherent in their application, require time-consuming processes and costs too high to be competitive with alternative materials.

BACKGROUND ART

Presently available multilayer composite solutions typically employ honeycomb sandwich structures (metal or plastic) or other cores of plastic materials, and a metallic interface or impregnated fibers to promote adhesion between the different layers.

The Canadian patent CA 02840850 of Forzastone LLC US, published on Jan. 28, 2014 and entitled "Composite Stone Panels" discloses a sandwich panel with stone surface using two aluminium sheets combined with a polyethylene core.

The PCT patent application WO 2012000893 of Fabiano Fulvi, published on 23 Jun. 2011 and entitled "Method for reinforcing stone slabs by means of a honeycomb panel including the simultaneous construction of said honeycomb panel" discloses a method of producing a plate of stone material reinforced with a honeycomb, without skins, where the skins are placed and cured during the reinforcement process.

The PCT patent application WO 9109733 of Stone Panels International Limited published on Nov. 7, 1991 and entitled "Methods for manufacturing composite surface elements" discloses a stone plate reinforced on both sides with fiber fabric, a layer of a multicellular lightweight material and an outer skin, which is divided into two by a plane of symmetry.

These solutions have some characteristics that impair their implementation in the market. The incompatibility between the stone material and the metal impairs the adhesion between the different layers, forcing the use of thicker adherent substances (which hinder homogenization along the surface) and requiring also the application of higher pressures during the production process.

In more detail, the uneven topographies of stone or reinforcement layer surfaces require higher compressive loading to bring the surfaces together and/or thicker adhesive layers to accommodate the topographic mismatches. In contrast, in the case of the panels described herein, the cork-based layer yields under much lower compressive loads, thus advantageously accommodating any such surface protuberances on either of its sides.

Moreover, high rigidity and poor elastic resilience of the multilayer composites disclosed in the background art prevent recovery of the original geometry after deformation. Additionally, industrial processing of stone and derivative materials, involves operations (finishing, cutting, storage conditions and transports) that induce considerably high stresses and strains in the stone layer, typically resulting in warpage or premature cracking of these types of known panel products.

Also, from the point of view of the ability to absorb impact energy, the honeycomb structures have disadvantages. Specifically, its structure greatly increases the stiffness, but has no ability to absorb impact energy. Similarly, the traction vibrations from an impact at low speed can create cracks in the stone material surface.

SUMMARY

The present disclosure allows for the use of a thin layer of stone material or stone derivative material, configured on a laminated composite panel, whose design and manufacturing process gives a panel whose mechanical, thermal and acoustic characteristics are superior to a layer of equivalent thickness of the same stone material (see FIG. 1).

Typically, the thickness of stone paneling currently used varies between 10-50 mm according to the application or use, for instance 30-50 mm for ventilated facade panels (exterior use) and 10-30 mm for flooring and wall covering (interior use).

Moreover, the reinforcement technology for stone based materials disclosed herein offers a reduction in the waste of stone material associated with typical thickness reduction operations, and provides for freestanding panels with reduced weight/dimension ratios for construction applications (see FIG. 2).

Advantageously, the panels of the present disclosure are dimensioned, and manufactured, such that:

The fragile material (ie. stone or derivative material) suffers compressive stresses when mechanically loaded in use, thus exploiting its better mechanical properties.

In more detail, when a material is subjected to flexural loading, the concave region of the material is under compressive stress whereas the opposing convex region of the material is under tensile stress. These two regions are divided by a zero stress line referred as the neutral axis. The multilayer laminate panels disclosed herein are constructed and dimensioned such that the neutral axis under flexural load applied from the exposed stone side is located outside the stone-based layer (and is preferably in a cork-based layer to which the stone layer is attached), leaving the stone layer under compression and, therefore, much stronger.

Homogeneous adhesion is ensured between the various layers, in order to provide a uniform behaviour of the multilayer panel product and prevent sudden detachment of the stone material or stone derivative material layer, whilst ensuring the transfer of strains to a more resilient layer of the panel (ie. the cork- or cork derivative-based layer);

The panel product displays adequate rigidity to be employed in various structural applications;

A significant improvement in the thermal and acoustic insulation characteristics of the stone or stone derivative material is provided by the incorporation of a cork-based material layer;

A reduction of shear stresses is observed in the fragile stone or derivative material under structural loading, thus minimising failure due to its fragile nature and increasing its resistance to cyclic stresses. As a consequence, the panel product disclosed herein meets higher safety requirements for its implementation in a variety of structural applications.

A first aspect of the present disclosure provides a multilayer laminate panel, which is characterized by incorporating a first layer of a stone-based material, a second layer of a dissimilar material of lower density, interposed by one or more layers of resin-impregnated fibers and configured such that the first layer is under compression when the panel is mechanically loaded, in particular from the exposed surface of the first layer, and supported on two or more anchoring points. The dissimilar material comprises cork or a derivative of cork, and the thickness of the layer of stone-based material is from about 2 mm to about 50 mm.

Also provided is a multilayer laminate panel comprising a first layer of a stone-based material having a thickness of from 2 mm to 50 mm, a second layer of a dissimilar material of lower density, which comprises cork or a derivative of cork, interposed by one or more layers of resin impregnated fibers.

A further aspect of the present disclosure provides a process for the production of a multilayer laminate panel as described above, which comprises the steps of:

(1) providing a layer of a stone-based material having a thickness of about 2 mm to about 50 mm;

(2) providing a layer of a dissimilar material of lower density, which comprises cork or a cork derivative; and (3) attaching the stone-based material layer to the dissimilar material layer by means of a layer of resin-impregnated fibers interposed between the stone-based material layer and the dissimilar material layer.

Another aspect of the present disclosure provides a multilayer laminate panel comprising fixing means, wherein the panel is as described above and wherein the fixing means is located in an orifice which extends through the at least one layer of dissimilar material and the at least one layer of resin-impregnated fibers to the surface of the stone-based material layer, to which the at least one layer of resin-impregnated fibers is attached, and wherein the fixing means is held in position in the orifice with resin.

Yet further aspects include the use of the panels described above as an interior or exterior coating; and an article selected from a wall, floor, ceiling, door frame, window frame, ventilation panel, item of furniture or decorative construction element comprising the above described panels.

The present disclosure also provides a process for attaching fixing means to a multilayer laminate panel as defined above, which comprises:

(1) forming an orifice in the panel, which orifice extends through the at least one layer of dissimilar material and the at least one layer of resin-impregnated fibers to the surface of the stone-based material layer, to which the layer of resin-impregnated fibers is attached;

(2) placing fixing means in the orifice; and (3) either before step (2), or after step (2), or both before and after step (2), introducing resin into the orifice.

DETAILED DESCRIPTION

Overview

Figure 1:
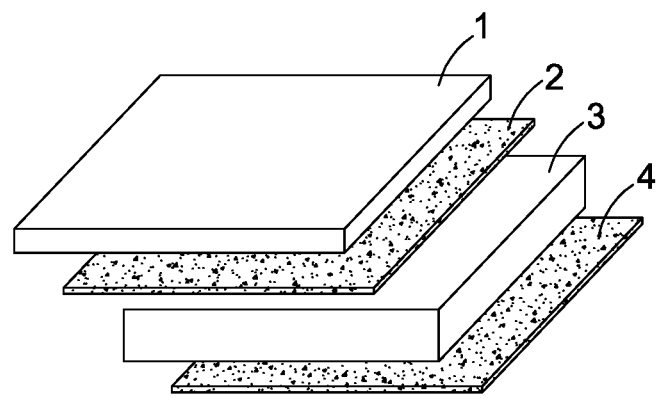
FIGS. 1 and 2 illustrate multilayer laminate panels of the present disclosure.

The lightweight laminated panel with stone based surface finishing disclosed herein allows for the transformation of the brittle behaviour of materials used as surface finishes into a non-linear elastic behaviour. This behaviour results from the configuration and arrangement between the panel layers in order to ensure uniform transmission of stresses between the different layers, and a compression regime in the brittle material.

The disclosed multilayer panel comprises a layer of stone material or derivative material for surface finishing, a further layer of a material with dissimilar properties and originated from cork or its derivatives, and one or more layers of fibers impregnated with resin, which resin is typically provided in liquid form and which then solidifies providing for the coupling (ie. attachment) between the various layers into one single panel.

When compared with the use of a single layer of stone or derivative material of adequate thickness for structural applications (for instance, approximately 30 mm for exterior applications or approximately 10 mm for interior applications), improved properties afforded by the multilayer composite panel disclosed herein translate into the following:

Increase of the Mechanical Strength Characteristics:

For the same stone thickness, e.g. 10 mm, an increase of at least about 2-fold in flexural strength has been observed. In addition, a corresponding increase in the maximum load at rupture of at least about or superior to about 7 times, preferably at least about or superior to about 10 times, and most beneficially of about 20 times, or even more, has been observed, typically with variation depending upon the type of stone used. These parameters were measured according to ASTM C293.

The improvement in the mechanical strength characteristics of the panels disclosed herein is also evident from, for instance, a comparison of stone slabs of approximately 30 mm thickness with a multilayer panel configuration comprising approximately 10 mm stone thickness and an approximately 10 mm cork agglomerate core layer, for which a reduction in mass of approximately three times is observed, but for which an increase of more than about two-fold in flexural strength is also observed.

Increase of the Maximum Specific Load:

The ratio of the maximum load to the mass per square meter for a multilayer panel increases by more than about 2 fold, preferably more than about 3 fold and most beneficially by about 5 fold, with variation typically depending upon the type of stone used, in comparison with that determined for a comparable stone slab. For instance, this increase is observed when comparing stone slabs of approximately 30 mm thickness to panels according to the present disclosure of approximately 10 mm stone thickness backed with an approximately 10 mm cork agglomerate core. The maximum specific load was calculated from measurements performed according to ASTM C293.

Increase of the Thermal Insulation Capacity:

The use of cork or cork derivative material has been found to improve the thermal insulation capacity of the panels disclosed herein as compared to standard stone panels, by a reduction of the thermal conductivity coefficient of at least about 50 times, as calculated according to ASTM C1363. This effect upon the thermal insulation capacity of the laminate panels has been observed to increase typically with increasing cork or derivative material layer thickness and, thus, the associated thermal resistance, since stone materials typically have thermal conductivity coefficients ranging from about 2 to about 7 W/mK, whereas cork and cork derivatives, eg. cork agglomerate, typically have coefficients ranging from about 0.030 to about 0.040 W/mK, for instance from about 0.032 to about 0.036 W/mK. Additionally the thin fiber reinforced resin layers beneficially add extra thermal insulation capacity. Typically, the multilayer panels have a coefficient of heat transmission of less than about 5 W/m$^2$K, as measured according to ASTM C976.

Increase of the Impact Sound Insulation Capacity:

The use of cork or cork derivative material has been found to improve the sound insulation index (measured according to ISO/CD 16251-1) of the panels disclosed herein as compared to standard stone panels by a factor of about 3 or, most beneficially, about 5. This effect has been found to be mostly dependent upon the core cork insulation properties and its thickness. The panels typically have a sound insulation index of at least about 10 dB, and more preferably greater than about 10 dB, for instance about 15 dB or more. For example, panels of 10 mm stone thickness backed with a 10 mm cork agglomerate core have sound insulation indexes of about 15 dB, as compared to 30 mm thickness stone slabs, which have sound insulation indexes of ranging from about 3 to about 5 dB.

Increase of Impact Resistance and Energy Absorption:

Impact resistance and energy absorption determination as carried out according to EN 14158 has revealed an increase in these properties of more than about 3 fold. For example, for a stone slab of approximately 30 mm thickness, the measured impact resistance of a free fall mass of 1 kg ranges from about 40 to about 65 cm above which the slab breaks catastrophically. In contrast, panels using the same stone in approximately 5 and 10 mm thicknesses, each panel having an approximately 10 mm cork agglomerate back reinforcement, have been determined as having significantly greater impact resistances of about 150-180 cm and about 190-220 cm respectively.

Increase of the Stone or Stone Derivative Material Flexibility:

Panels disclosed herein have been found to exhibit a non-linear elastic deformation without breaking. This behaviour has been observed, and quantified, using a video extensometry technique as described below. This elastic deformation of the panels extends well beyond the maximum deformations observed for stone and stone derivative materials in standard slab format.

In more detail, panels disclosed herein typically possess an ultimate deflection of about two times, or more than two times, the thickness of the panel. The ultimate deflection is the distance of the deflection, or bending, at which rupture, ie. breakage, of the panel occurs. As described in more detail below, the deflection was measured by video image correlation (VIC) using an area defined by the specimen thickness and +/−5 mm for each side of the mid span point (in total 10 mm of the specimen width) with a total number of points within this area between 1000 and 1200. The ultimate deflection observed is a function of the span length used in the flexural test, i.e. the distance between the supporting elements, also known as "support span". In the testing reported herein, a support span of approximately 250 mm was used, in accordance with the support spans typically reported in ASTM standards for flexural tests. Spacing of the supports further away from one another will allow for larger ultimate deflections.

More specifically, panels disclosed herein possess an ultimate deflection of from about 0.2 times to about 2.0 times their thickness for a span length of approximately 250 mm, more preferably about 0.3 times to about 2.0 times, even more preferably about 0.35 times to about 2.0 times, for instance about 0.5 times to about 2.0 times, or about 0.8 times to about 2.0 times, or about 1.2 times to about 2.0 times, or about 1.5 times to about 2.0 times, or about 1.8 times to about 2.0 times; with an ultimate deflection of about 2.0 times, or greater, the panel thickness being most preferred.

For example, panels with approximately 5 or 10 mm stone layer thickness and comprising an approximately 10 mm cork agglomerate core have been found to exhibit an ultimate deflection of about 0.35 to about 2 times the total thickness of the panel on a span length of approximately 250 mm. When compared to a stone slab with the same thickness as that of the surface finishing layer of the above-mentioned panel, e.g. 10 mm, the deflection to rupture of the panel described herein has been found to increase by a factor greater that about 10 to 20 times, or more, depending upon the stone type. Most beneficially, for deflections of up to at least about 90% of this ultimate deflection, substantial shape recovery (ie. recovery of at least about 88% of the panel's original shape, more preferably at least about 90%, and even more preferably at least about 95%, and up to about 100%) of the panels has been observed. This is a particularly beneficial characteristic of the panels described herein.

Figure 6:
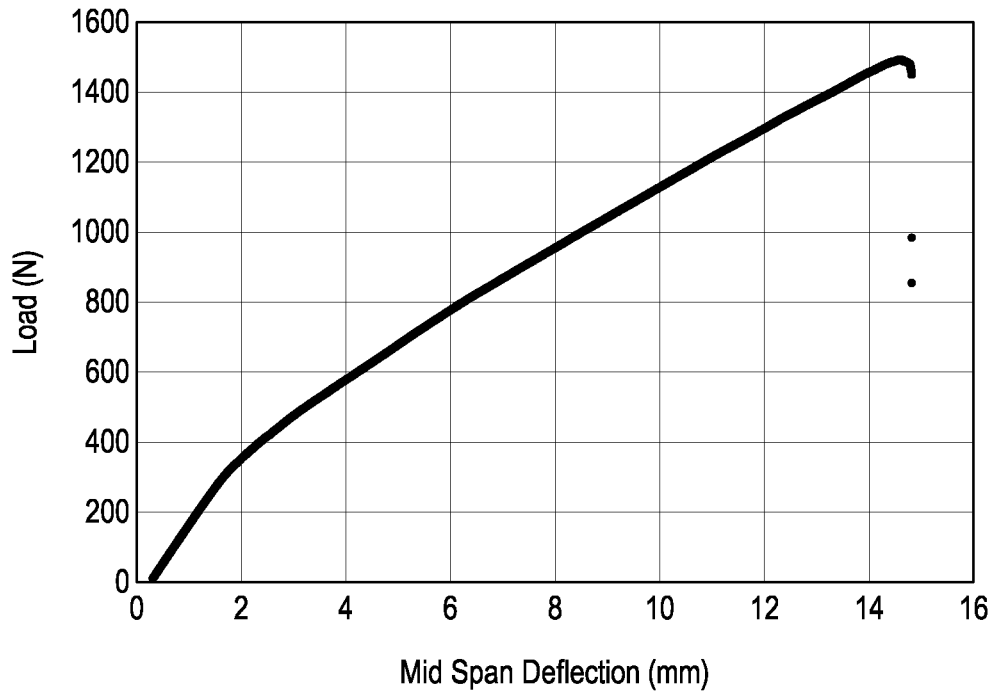
FIG. 6 illustrates the mid span deflection versus the applied load of a panel of the present disclosure.
Figure 7:
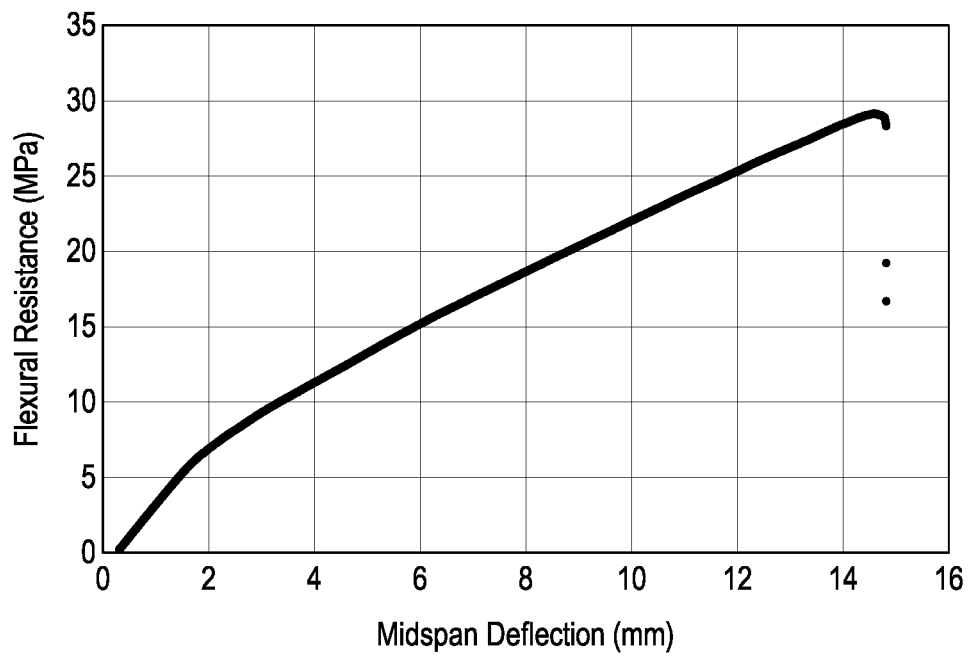
FIG. 7 illustrates the mid span deflection versus the flexural resistance of a panel of the present disclosure.

This advantageous elastic deformation behaviour of the panels disclosed herein is further illustrated by FIGS. 6 and 7 which plot, respectively the mid span deflection (in mm) versus the load (in N), and the mid span deflection versus the flexural resistance (in MPa; as measured in accordance with ASTM C293). The mid span deflection is the variable measured on the flexural test that varies according to the load applied between zero and the ultimate deflection which is observed at rupture load. FIGS. 6 and 7 report the properties of a panel comprising an approximately 5 mm Sea White limestone layer and an approximately 10 mm cork agglomerate layer (NL20 from Amorim Cork Composites, Mozelos VFR, Portugal) with two layers of epoxy-impregnated glass fiber layers (the epoxy resin being Resotech 1050 from Resoltech S.A.R.L., Eguilles, France). The first fiber layer comprised a biaxial glass fabric consisting of two fabric layers of unidirectionally oriented glass fibers positioned at 0 degrees and 90 degrees, and having a specific mass of approximately 600 g/m$^2$; and the second comprised a serge fabric with specific mass of approximately 300 g/m$^2$.

The video extensometry technique used to observe this elastic deformation of the panels disclosed herein uses video image correlation (VIC). VIC is a system for measuring and visualizing both strain and movement by means of image comparison. It provides full-field, 2- or 3-Dimensional measurements of shape, displacement and strain, based upon the principle of Digital Image Correlation. Using this method, actual object movement is measured and the Lagrangian strain tensor is available at every point on the specimen surface.

The system consists of one or two cameras (for 2D or 3D analysis respectively) that capture images during a mechanical test, ie. the deformation of the panel by deflection, or bending, and software that makes the correlation, based upon the mapping and monitoring of the image pixels. Using this apparatus, it is possible to record the displacement very accurately on every point of the specimen by tracking the pixels in the image provided by the camera. The data so-obtained are then analysed using the associated software, and thus provide very precise information of what is happening in the structure during the bending test.

Panels according to the present disclosure are readily manufactured as their production is advantageously compatible with the technology currently available in the stone processing industry. Namely:

Compatibility with a very wide range of stone materials and derivatives, which are typically obtained with an average surface roughness (Ra) of from about 0.1 to about 30 μm (measured in accordance with standard surface topography techniques), and typically present an open porosity greater than about 0.01% (measured according to EN1936). These characteristics are typical of most stone materials and surface roughness values presented by slabs processed according to currently available technology.

Compatibility with slab dimensions currently produced (e.g. approximately 3500 mm length and width and about 10-50 mm thickness) along with the possibility of using conventional surface finishing processes (e.g. grinding and polishing) to thin the stone or derivative material layer down to as low as about 2 mm thickness.

Compatibility with resin application and curing processes known to the stone processing industry for back reinforcement and surface finishing.

In the multilayer laminate panels described herein, the one or more stone or stone derivative layers have a thickness of from about 2 mm to about 50 mm, preferably from about 2 mm to about 40 mm, more preferably from about 2 mm to about 30 mm, yet more preferably from about 2 mm to about 20 mm, and even more preferably from about 2 mm to about 15 mm. Further preferred thickness ranges for the stone-based layer include from about 2 mm to about 10 mm, about 5 mm to about 15 mm, and about 10 mm to about 20 mm. Most preferably, the at least one stone-based layer is about 2 mm, about 5 mm, about 10 mm or about 15 mm in thickness.

The overall thickness of the panel products described herein typically ranges from about 5 mm to about 60 mm, preferably from about 5 mm to about 50 mm, and more preferably from about 5 mm to about 45 mm. Other overall thicknesses are possible depending upon the individual layers included in the overall structures, as well as the intended application of the panels.

The panels comprise one or more layers of fibers impregnated with resin, each of which is typically of a thickness of from about 0.5 to about 5 mm, for instance, about 0.5 to about 2.0 mm.

Furthermore, the one or more layers of material with characteristics based on cork or derived from cork which are included in the multilayer panels are typically of a thickness of from about 1 mm to about 50 mm, more preferably from about 3 mm to about 40 mm, yet more preferably from about 5 mm to about 30 mm, or from about 5 mm to about 25 mm, or from about 5 mm to about 20 mm, with cork-based layers of about 5 mm to about 15 mm thickness, for instance approximately 10 mm, being particularly preferred.

In addition to the dimensions detailed herein, the technology may be adapted to other dimensions as necessary, for instance as required by the particular end application for which the panel is intended.

The characteristics described above for the inventive panels are largely achieved by the specific choice of the various constituents, and their arrangement and dimensioning in the multilayer laminate, as well as the coupling of the different layers effected by the manufacturing process. The described technology provides new multilayer laminate materials, which meet or surpass the technical requirements of applications that presently use natural stone or its derivatives. Furthermore, the multilayer materials can be fitted to different structural products (e.g. ventilated facade panels), or ornamentals, including all types of interior and exterior coatings/coverings, floors, flooring, tables and counter-tops, as well as framing structures for windows, doors and masonry, for example.

Therefore, in addition to the advantages associated with the use of lighter weight stone panels, for instance reduced weight and larger dimensions, panels according to the present disclosure have the following unique benefits: i) significantly higher mechanical flexibility and the ability to accommodate bending and recover to their original shape; ii) enhanced impact resistance and energy absorption; and iii) superior thermal and acoustic insulation properties arising from the use of cork or derivative material.

Mechanical Behaviour of the Laminated Panel

Bending of a material induces a stress gradient, which varies between maximum tensile stress to maximum compressive stress on each surface of the material. The so-called "neutral axis" defines the location separating tensile stresses from compressive stresses which corresponds to zero stress.

According to the classical theory of bending beams, for a homogeneous material with a constant Young's Modulus for tensile and compressive stresses, the neutral axis is coincident with the midline. However, on a composite material with different layers, the neutral axis can be shifted by adjusting the thickness of each material and taking into account their Young's Moduli.

For the multilayer panel disclosed herein, and as has already been discussed, the neutral line is always located outside the material layer that provides the stone-based surface finish, and is preferably located in the cork-based layer. It is in accordance with the following relationship:

$$h2 = h\sqrt{\gamma}/(1+\sqrt{\gamma})$$

where h2 is the maximum thickness (in mm) of the layer of material which provides the surface finish; h is the total thickness (in mm) of the laminated board; and γ is the ratio of the tensile Young's modulus (ET) and the compressive Young's modulus (Ec), each as determined in accordance with ASTM C293.

In the case of the laminated multilayer composites of the present disclosure, the stone-based material used as the surface finish material, when tested alone, displays a poor response to tensile stress as compared with its response to compressive stress. The threshold stresses are typically about 7 up to 10 times lower. Thus, the thicknesses of the layers included in the presently described panels are optimized in order for the surface finish material to be mostly subjected to compressive stresses. However, for this desired effect to occur, it is also necessary to take into account how the characteristics of the various layers are related with each other. Thus, the multilayer laminate panels of the present disclosure provide optimised stone-based materials with advantageous mechanical properties.

Materials

The surface finish material with the greatest potential to be used in the disclosed panels is natural stone. In general, rock-like source materials behave differently depending upon their physical, chemical and microstructural characteristics. Using the design and manufacturing methodology according to the present disclosure, it is possible to extend the use of most of these materials, as the limitations arising from poor mechanical properties (ie. tensile strength, shear strength or impact resistance) are substantially overcome.

Natural stone types particularly suitable for use in the multilayer panels include those typically used in stone paneling applications, for example limestones, marbles, granites including gneisses and pegmatites, schist rocks including slate and quartzite, and agglomerated stone.

For the at least one layer of cork or cork derivative material, natural or industrially processed materials can be used, which typically have densities (as measured in accordance with ASTM C271) of from about 30 to about 1500 $kg/m^3$ and preferably from about 100 to about 400 $kg/m^3$. Particularly preferred materials have densities of from about 110 to about 350 $kg/m^3$, even more preferably from about 115 to about 300 $kg/m^3$, or from about 120 to about 250 $kg/m^3$, for instance approximately 120 $kg/m^3$, 200 $kg/m^3$, or 250 $kg/m^3$.

Preferred cork-based materials have a compressive strength (as measured in accordance with ASTM C365) of about 0.1 to about 1.0 MPa, preferably about 0.2 to about 0.8 MPa, and yet more preferably about 0.3 to about 0.6 MPa, for instance approximately 0.3 MPa, 0.5 MPa or 0.6 MPa.

Preferred cork-based materials have a compressive modulus (as measure in accordance with ASTM C365) of about 3.0 to about 10.0 MPa, more preferably about 4.0 to about 8.0 MPa, and even more preferably about 5.0 to about 7.0 MPa, for instance approximately 5.1 MPa, 6.0 MPa or 6.9 MPa.

Preferred cork-based materials have a tensile strength (as measured in accordance with ASTM C297) of about 0.4 to about 0.9 MPa, more preferably about 0.5 to about 0.8 MPa, and yet more preferably about 0.6 to about 0.7 MPa, for instance approximately 0.6 MPa or 0.7 MPa.

Preferred cork-based materials have a shear strength (as measured in accordance with ASTM C273) of about 0.7 to about 1.2 MPa, more preferably, 0.8 to about 1.1 MPa, and even more preferably about 0.9 to about 1.0 MPa, for instance approximately 0.9 MPa or 1.0 MPa.

Preferred cork-based materials have a shear modulus (as measured in accordance with ASTM C273) of about 5.7 to about 6.2 MPa, more preferably about 5.8 to about 6.1 MPa, and even more preferably about 5.9 to about 6.0 MPa, for instance approximately 5.9 MPa or 6.0 MPa.

Preferred cork-based materials have a thermal conductivity (as measured in accordance with ASTM C377) of about 0.030 to about 0.040 W/mK, more preferably about 0.031 to about 0.038 W/mK, and even more preferably about 0.032 to about 0.036 W/mK, for instance approximately 0.032 W/mK, 0.034 W/mK or 0.036 W/mK.

Preferred cork-based materials have a loss factor (at 1 KHz and as measured in accordance with ASTM E756) of about 0.020 to 0.070, and more preferably 0.022 to 0.062, for instance approximately 0.022, 0.043 or 0.062.

Particularly preferred cork-based materials for use in the disclosed multilayer panels have one of the following combinations of properties: A material with one or more of: a density of about 120 $kg/m^3$, a compressive strength of about 0.3 MPa, a compressive modulus of about 5.1 MPa, a tensile strength of about 0.6 MPa, a shear strength of about 0.9 MPa, a shear modulus of about 5.9 MPa, a thermal conductivity of about 0.032 W/mK and a loss factor of about 0.022. A particularly preferred material has all of these properties.

A material with one or more of: a density of about 200 $kg/m^3$, a compressive strength of about 0.5 MPa, a compressive modulus of about 6.0 MPa, a tensile strength of about 0.7 MPa, a shear strength of about 0.9 MPa, a shear modulus of about 5.9 MPa, a thermal conductivity of about 0.032 W/mK and a loss factor of about 0.043. A particularly preferred material has all of these properties.

A material with one or more of: a density of about 250 $kg/m^3$, a compressive strength of about 0.6 MPa, a compressive modulus of about 6.9 MPa, a tensile strength of about 0.7 MPa, a shear strength of about 1.0 MPa, a shear modulus of about 6.0 MPa, a thermal conductivity of about 0.036 W/mK and a loss factor of about 0.062. A particularly preferred material has all of these properties.

Suitable, commercially available materials include, for example, Corecork NL10, NL20 and NL25 available from Amorim Cork Composites, Portugal. These materials are preferably selected to provide for a minimum resin uptake, to ensure impregnation (ie. entry of the resin into at least some of the open spaces, or pores, in the cork-based material) during processing, as well as facilitating low water absorption, rot and fire resistance and a high level of attenuation of impact noise and vibrations.

In relation to the behaviour of the resin during production of the panels, it is noted that the resin is typically impregnated, or imbibed, into the open porosity and surface "openings" of both the stone-based and cork-based layers, the resin being provided by the fiber-containing reinforcement layer(s) which serve to couple, or attach, the other layers together to form a unitary panel structure. As a consequence, the failure of multilayer laminates by delamination between layers, which was previously observed, is substantially reduced in the multilayer panels described herein, and the transfer of load/stress is more effective. This is a marked, and advantageous, difference from ordinary laminates, which typically comprise a sharp and well-defined, discrete interface between layers. Whilst not wishing to be bound by theory, it is thought that this key combination of layers of specific materials, and in particular the impregnation of the resin into not only the fibrous layer(s) but also the stone- and cork-based layers, may explain the unexpected mechanical properties of the multilayer composites described herein, such as the flexibility observed and the capacity to bend and recover shape. The resin impregnation, or imbibition, is facilitated by the fact that both stone and cork materials have open pore structures.

Suitable resins for use in the multilayer panels are typically provided in liquid form and include, for example, epoxy resins, for instance Resoltech 1050, which is available from Resoltech S.A.R.L., Eguilles, France, and Sicomin SR1500, which is available from Sicomin, Châteauneuf-les-Martigues, France; polyester resins including, for example, Recapoli 955 DCPD, which is available from Resinas Castro S.L., Pontevedra, Spain; vinylester esters, such as Resicastro X590AC, also available from Resinas Castro S.L., Pontevedra, Spain; and acrylic resins, such as Crestapol 1250LV, available from Scott Bader, Wellingborough, UK.

The chemical structure and viscosity of the resins used are typically optimized taking into account the microstructure (ie. mineralogy and porosity structure) of the stone materials.

Typically, the viscosity of suitable resins (as reported by the resin manufacturers) ranges from about 100 to about 2000 mPa·s, depending mostly on the stone or derivative material open porosity. More preferred resins have a viscosity of from about 100 to about 1000 mPa·s, more preferably from about 100 to about 500 mPa·s, and even more preferably the resin viscosity is from about 300 to about 450 mPa·s, for instance approximately 400 mPa·s. Typically, open porosity of the stone-based materials may vary between about 0.1% and about 19%, or higher (according to EN1936). The higher this figure, the higher the resin viscosity which can be used. So, for instance, for a stone-based material with an open porosity of at least about 0.1%, a resin with a viscosity of at least about 100 mPa·s may be used; whereas, for a stone-based material with an open porosity of about 19%, or even higher, a resin with a viscosity of up to an including about 2000 mPa·s may be used. Furthermore, as viscosity has a dependence upon temperature, this may also be tuned to ensure adequate process viscosities for optimized penetration of the resin into the stone or derivative material layer(s) and into the cork-based core layer(s).

With regard to the at least one resin-impregnated fiber layer comprised in the multilayer panel, as discussed above the panel preferably comprises at least two layers of fibers, with one positioned at the interface between the stone or derivative material and the cork or cork derivative core layer, and the second positioned on the exterior face of the cork or cork derivative core (see FIG. 1).

Fibrous materials which can be used to form the multilayer panels may be selected from those commonly used as reinforcement in construction materials, for instance. Suitable fibrous materials include woven materials, including for instance those in which the warp and weft directions of the fibers are at approximately 90° to one another. Preferred woven materials include serge, tafetan, and the like. Non-woven materials may also be used, including for instance those in which the constituent fibers are unidirectionally or biaxially oriented, in particular those made from glass fibers. For instance, where the multilayer panel comprises two fibrous layers as described above, the first fiber layer is preferentially a multiaxial reinforcement fabric, more preferably made from glass fibers, and which preferably has a specific mass between 150-300 g/m² per orientation axis, for instance a biaxial glass fabric with fibers oriented at 0/90 degrees and which has a specific mass of about 600 g/m². The second fiber layer preferentially comprises a woven fabric with a specific mass between 150-300 g/m², for instance serge or tafetan fabric. However, the type and ordering of the fibrous layers may be modified. Furthermore, other fiber materials (e.g. carbon fibers, polymeric fibers such as Kevlar® and the like, and fibers of natural origin) and fiber arrangements (e.g. four-axial reinforcement, knitted fabrics and non-woven fabrics), as well as other resin types (e.g. oil based or natural source resins) may also be employed in the manufacture of the multilayer panels.

Exemplary configurations of the multilayer panels described herein are presented in Table 1. All of the laminate panels in Table 1 comprise the same reinforcement, specifically a 10 mm core of cork agglomerate (NL20, Amorim Cork Composites), with two layers (or "skins") of glass fiber impregnated in epoxy resin. The first is located at the interface between the stone layer and the cork core and the second is located on the exterior face of the core. For these two layers different types of glass fiber were used with different weights, the first being a biaxial glass fabric consisting of two fabric layers of unidirectionally oriented glass fibers positioned at 0 degrees and 90 degrees, and having a specific mass of approximately 600 g/m²; and the second being a serge fabric with specific mass of approximately 300 g/m². The resin used is the multilayer panels reported in Table 1 was a commercially available two component epoxy resin, specifically Resoltech 1050, as mentioned above.

TABLE I

Mechanical properties of multilayer panels with three different stone materials of 5 and 10 mm thickness compared to 10 and 30 mm thickness stone slabs of the same origin.

| | Portuguese Stone Blue Limestone-"Moleanos" | | | | Sea White Limestone-"Branco do Mar" | | | | SPI Granite-"Azul Alpalhão" | | | |
|---|---|---|---|---|---|---|---|---|---|---|---|---|
| | Multilayer Panel | | Stone | | Multilayer Pane | | Stone | | Multilayer Panel | | Stone | |
| Stone Layer Thickness | 5 mm | 10 mm | 10 mm | 30 mm | 5 mm | 10 mm | 10 mm | 30 mm | 5 mm | 10 mm | 10 mm | 30 mm |
| Specimen Thickness (mm) | 15.8 | 20.7 | 10.0 | 30.0 | 16.0 | 21.0 | 10.0 | 30.0 | 16.0 | 21.0 | 10.0 | 30.0 |
| Specific Mass (kg/m²) [a] | 17.1 | 30.0 | 27.0 | 78.0 | 17.2 | 31.0 | 25.0 | 69.0 | 18.0 | 30.7 | 28.0 | 80.0 |
| Maximum Load (N) [b] | 1988.0 | 2615.0 | 290.0 | 2520.0 | 1486.0 | 2550.0 | 105.0 | 1196.0 | 2577.0 | 3884.0 | 330.0 | 2860.0 |
| Flexural Strength (Mpa) [c] | 40.2 | 31.3 | 14.3 | 13.9 | 28.0 | 24.7 | 6.5 | 6.6 | 46.0 | 44.0 | 17.2 | 15.7 |

The figures presented for maximum load and flexural strength are averages from 10 specimens.
as determined by [a] ASTM C271;
[b] ASTM C293; and
[c] ASTM C293

As is shown by the results in Table 1, the multilayer panels disclosed herein possess superior mechanical properties in comparison with those of comparable, standard stone slabs made from a range of different stone types.

Figure 3:
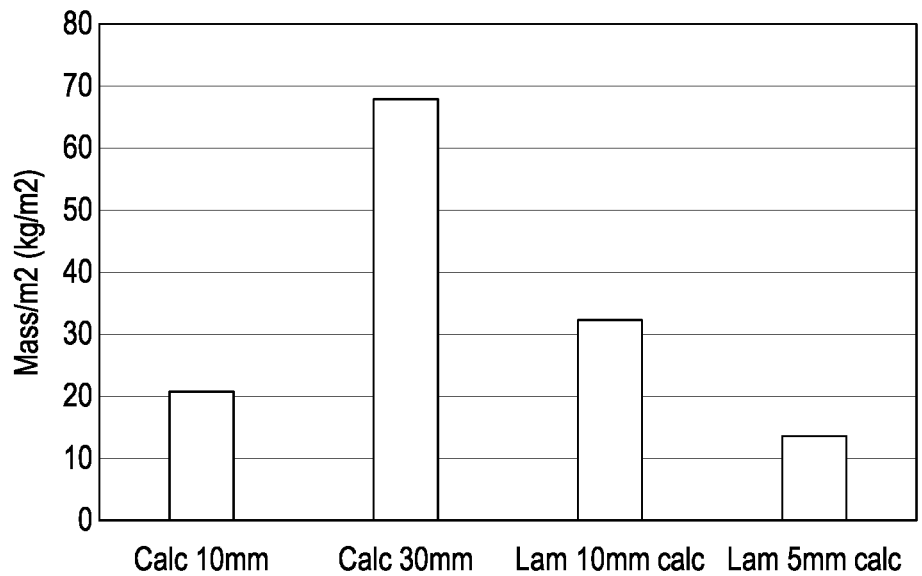
FIGS. 3, 4 and 5 illustrate the results of various comparative tests performed on multilayer laminate panels of the present disclosure and limestone panels, in terms of mass per unit area (FIG. 3), maximum load and specific load (FIG. 4), and maximum flexural resistance and specific flexural resistance (FIG. 5). In these Figures, the limestone panels are identified as "calc 10 mm" and "calc 30 mm". The multilayer panels are identified as "Lam 5 mm calc" and "Lam 10 mm calc", each respectively containing a 5 mm and a 10 mm layer of limestone.
Figure 4:
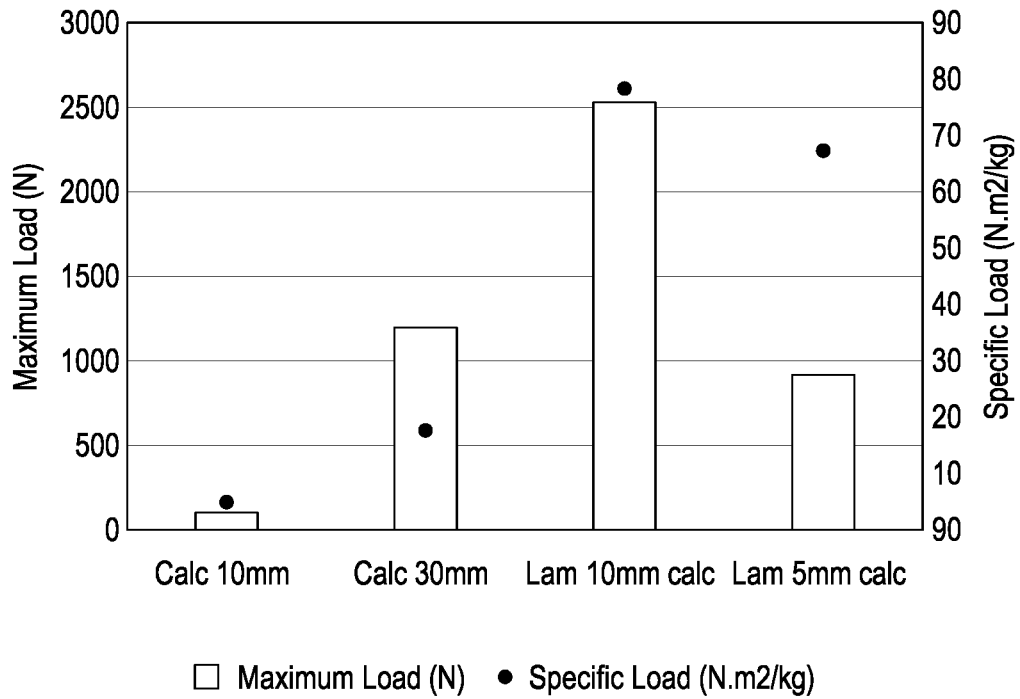
Figure 5:
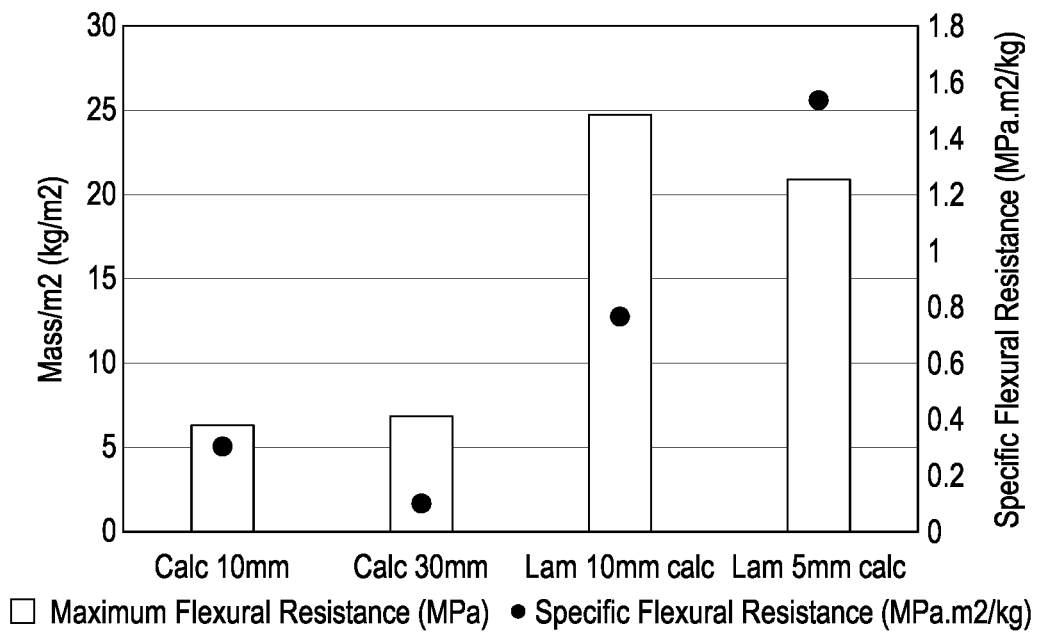

FIGS. 3, 4 and 5 further illustrate the major gains in mechanical properties of the multilayer laminate panels compared to natural stone slabs of equivalent thickness. The stone selected for the comparison illustrated in FIGS. 3 to 5 is a Sea White Limestone of medium porosity, ie. approximately 8-11% as per EN 1936, which can be considered the most demanding material with regard to its basic properties, since it is not only one of the most fragile stone materials, but it is also very difficult to obtain and handle at reduced thickness (e.g. 5 or 10 mm) by means of the technologies currently available to the stone processing industry.

Handling and Application Behaviour

As mentioned above, the used production method allows for the multilayer panel to be self-supporting such that very large panels (eg. 3500×2500 mm) can be handled without concern of damage by action of their own weight, thus facilitating amongst other things ease of transportation. Without the enhancement described herein, it is not possible to transport a plate of a low thickness surface finish material (typically 5 mm) near the maximum dimensions currently available on the market (eg. 3500×2500 mm). The smallest thickness which is currently able to be produced from blocks by the industry is about 8 mm in granite and 12 mm in limestone, and even these are only possible to obtain using state of the art, cutting edge technologies, which are still new and not usual in the stone processing industry. With the current development, it is possible to start the production of panels from blocks using standard technology, such as slabbing gang saws, and therefore obtain an element (as illustrated, for example, in FIG. 2) capable of being sectioned to provide two panels of approximately the desired final thickness for surface finishing of the stone-based material.

On the other hand, two situations currently exist that cause a difficulty in the market associated with the application of stone or derivative materials. The first is related to comfort (thermal and acoustic) where usually the products made from these materials do not compete with others, in particular for flooring applications. The second relates to the methods of direct and indirect fixing (ie. anchorage), which currently have scaling problems associated with the stone characteristics and their ability to withstand stresses encountered during the lifetime of the products.

The production method of the multilayer panels described herein allows the use of fixing/clamping systems, either by mechanical or chemical means, to be made more reliably, for the following reasons (with reference to FIG. 1):

The multilayer panel has a greater total thickness as compared to individual slabs of the stone or derivative material layer (1);

The fixing/clamping system may be in contact with or, is more preferably embedded within, the fibrous resin reinforcing layer (2), which layer is in contact with the stone-based layer (1), with minimal stress being induced in stone-based layer (1);

The pull-out resistance of the fixing/clamping system is increased by about two times in multilayer panels described herein, as compared to a standard stone slab;

The additional reinforcing layer (4) can be explored for additional fixing or stabilisation means, as this layer is spaced from the stone or derivative material by the cork agglomerate core thickness and also possesses a different surface chemistry.

Fixing or clamping means suitable for use with the panels disclosed herein, in order to attach the panels to structures (eg. a wall) as required, include, for example, fixing or clamping means typically used with composite materials, in particular in the construction industry. Such means include those made from metal, for example stainless steel. With standard stone slabs, fixing or clamping means are required to be attached directly to the stone, thus subjecting the stone to a large amount of stress, which can result in weakening, cracking and even eventual breakage of the slab. With the panels described herein, however, it has been found that the specific attachment of the fixing (or clamping) means such that it is located at least in part within the cork-based layer (3) and the fibrous layer (2) located between the cork-based layer (3) and the stone-based layer (1), achieves a very effective system for attachment of the panels to other structures, such as walls, which does not place the stone-based layer under detrimental stress.

In more detail, a multilayer laminate panel as described herein comprises fixing means, which is located in an orifice extending through the at least one layer of dissimilar material (3) and the at least one layer of resin-impregnated fibers (2) to the surface of the stone-based material layer (1), to which the at least one layer of resin-impregnated fibers (2) is attached. The fixing means is held in position in the orifice with resin. The fixing means may be attached with resin to the surface of the stone-based material layer (1) located at the end of the orifice so-formed. In addition, or in the alternative, the space in the orifice, which is not occupied by the fixing means may be filled with resin.

Particularly suitable fixing means for use with the panels are those which comprise a substantially flat plate with a shaft extending from the middle of the plate, which shaft may be hollow and is typically cylindrical. In use, the shaft attaches to fastening means typically located on the structure to which the panel is to be attached, thus, holding the panel in the desired position. The plate portion of the fixing means may be of a variety of shapes, for instance square, rectangular, circular or hexagonal, and it may have holes cut through it. Suitable fixing means include those commercially available under the name "Master-Plate" from Specialinsert s.r.l, of Turin, Italy (see, for example, http://www.directindustry.com/prod/specialinsert-srl/product-58531-1428839.html).

Such fixing means are attached to multilayer laminate panels described herein by forming an orifice in the panel, which extends through the at least one layer of dissimilar material (3) and the at least one layer of resin-impregnated fibers (2) to the surface of the stone-based material layer (1), to which the layer of resin-impregnated fibers (2) is attached; placing fixing means in the orifice; and either before or after, or both before and after the fixing means are placed in the orifice, introducing resin into the orifice. Preferably, resin is introduced into the orifice both before and after placement of the fixing means in the orifice, such that the remaining space in the orifice, which is not occupied by the fixing means, is filled with resin.

In more detail, the process of attaching fixing means to the panel typically comprises:

1. Providing an orifice, or hole, through the reinforcement layer(s) and cork-based layer(s) which extends to the surface of the stone-base layer to which the reinforcement layer is attached, but does not extend into the stone-based layer. This orifice is sized such that the fixing means can fit into it. For instance, if a "plate and shaft" style of fixing means such as that described above is used, the orifice needs to be able to accommodate the plate of the fixing means such that it sits upon the inner surface of the stone-based layer. The shaft of the fixing means thus extends up through the orifice away from the plate, such that the fixing means is accessible to be attached to the means used to fasten the panel to the desired structure, when the panel is in use. The orifice may be formed by any suitable technique, for instance milling or drilling through the panel from its side away from the stone layer down to the inner stone surface.

2. Once the orifice has been formed, fixing means such as those described above is placed within the orifice and it is typically fixed into position using a resin. For instance, if the fixing means is made of metal, as is typically the case, a resin which is specially formulated for metal/stone compatibility is preferably used for this purpose. An example of such a resin is AKEMI 2030, which is an epoxy resin available from AKEMI GmbH, Nurnberg, Germany.

3. The remaining space in the cleared hole is then filled with a resin, such as those already mentioned for use in the preparation of the fiber/resin layers of the panel. Low viscosity epoxy resins, such as Resoltech 1050 available from Resoltech S.A.R.L, are particularly preferred for this purpose. The resin impregnates the cork-based core layer, and preferably also the other layers, surrounding the orifice.

4. Once the resin components have solidified, or hardened, the fixing means is extremely securely and effectively retained within the panel.

The key advantage of this special fixing system as compared to traditional systems is that adhesion to the stone layer ensures resistance to static loads, whilst the cork-based core impregnation provides for additional protection to cyclic loads. In particular, the cork-base layer absorbs vibration without subsequent transmission to the stone-based layer.

Manufacturing Method

Panels according to the present disclosure comprise the following materials (with reference to FIG. 1):

One or more layers of stone or derivative material conferring the surface finish (1);

A shear-resistant core originated from cork or its derivatives (3);

One or more fiber layers (2, 4) impregnated with resin, which confer the mechanical strength at the interfaces between (1) and (3) and/or to the exposed surface of layer (3) and ensure adequate coupling between the constituent layers.

Figure 2:
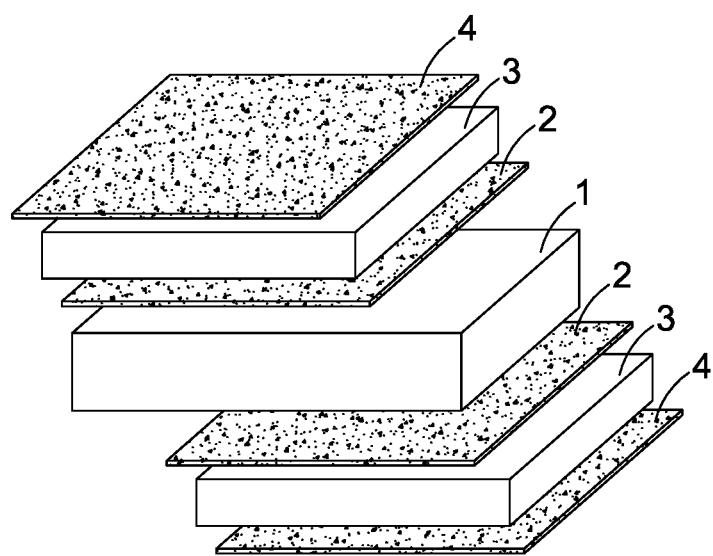

Panels according to the present invention may also be manufactured having a symmetrical configuration (as shown in FIG. 2), which is particularly useful for subsequent sectioning along layer (1) yielding two panels, for instance as shown in FIG. 1.

Multilayer composite panels according to the present disclosure are generally manufactured in the following way:

1. Providing a (preferably dry) surface finish material layer (1), typically chosen from stone or a stone derivative material.

2. Providing a coupling layer of resin-impregnated fibers (2), typically by the following steps:

2A.—Applying a (preferably liquid) resin to the stone or derivative material layer (1); and then 2B.—Applying a fiber arrangement, for instance a multiaxial glass fiber material, on top of the resin;

2C.—Subsequently applying a further amount of the (preferably liquid) resin to the fibrous component to ensure adequate impregnation of the fiber arrangement laid down in step 2B and to provide an additional amount for imbibition of the core (ie. cork or cork derivative) material layer (3). The ratio of resin to fiber is adjusted to ensure adequate coupling between the stone or derivative material and the core layer. This ratio is preferentially higher than a proportion of about 50%-65% (on a weight by weight basis of resin to fibers) commonly used in existing sandwich composite manufacture.

3. Applying the core material (3), chosen from cork or cork derivative material, such as a cork agglomerate;

4. Applying a pressure of typically from about 10 to about 1000 Pa, preferably from about 20 to about 200 Pa, to ensure adhesion between the above-referenced layers; 5. If required for the particular panel construction, applying a second resin-impregnated fiber layer (4), which may or may not be identical to layer (2) depending upon the intended application, in a similar way as described for step 2, ie. the liquid resin is applied to the core material layer (3) and then the fiber arrangement is laid down and additional resin is applied to ensure fiber arrangement impregnation;

6. Allowing a period of time for the resin to reach its gel point at a given process temperature, which is a function of the selected resin (e.g. approximately 90 minutes at room temperature for Resoltech 1050);

7. Applying a pressure of typically from about 1 to about 50 kPa, preferably from about 1.5 to about 30 kPa, for a period of time and typically at a given temperature to ensure adequate coupling and curing of the chosen resin (e.g. approximately 12 hours at room temperature for Resoltech 1050); and 8. Optionally conducting a post-cure process at elevated temperature (eg. approximately 60° C.) for a period of time (e.g. approximately 6 hours).

Additional release liners may be employed on resin coated surfaces to prevent adhesion to contact surfaces during processing, handling and transportation.

Alternative curing or post-curing processes may include one or more of the following methods: heating by conduction; heating by microwave; heating by infrared; and ultraviolet photo-curing.

A further, significant advantage of the present disclosure is the possibility to leverage on already existing stone processing industrial plants. For example, stone slabs reinforced according to the present disclosure can be manufactured with large dimensions (ie. width and length up to approximately 3500 mm). Moreover, the reinforcement provided by the present disclosure allows for currently available grinding and polishing processes to be carried out in a cost-effective way and without damaging the stone or derivative material layer. Additionally, using current stone industry technology (eg. sawing and wire cutting), it is possible to obtain from a surface element with an initial thickness of about 20 mm or less—(see FIG. 2), two thinner elements, whose final thickness depends upon the amount of material lost by abrasion due to the cutting tool used.

What is claimed is:

1. A multilayer laminate panel, comprising:
a first layer of a stone-based material;
at least one layer of a dissimilar material of a lower density than a density of the first layer of the stone-based material;
a first layer of resin-impregnated fibers interposed between the first layer of the stone-based material and the at least one layer of a dissimilar material; and
a second layer of the resin-impregnated fibers disposed on a surface of the first layer of the stone-based material that is located on an opposite side of another surface of the first layer of the stone-based material on which the first layer of the resin-impregnated fibers is disposed,
wherein the panel is configured such that the first layer of the stone-based material is under compression when the panel is mechanically loaded and supported on two or more anchoring points,
wherein the dissimilar material comprises cork or a derivative of cork,
wherein a thickness of the layer of stone-based material is from about 2 mm to about 50 mm, and wherein a location of a neutral axis of the panel is located outside the first layer of the stone-based material and outside the first layer of the resin-impregnated fibers and the second layer of the resin-impregnated fibers, and is located in the at least one layer of the dissimilar material.

2. The multilayer laminate panel of claim 1, having, in order, the second layer of the resin-impregnated fibers, a layer of a stone-based material including the first layer of the stone-based material, a layer of the dissimilar material of the at least one layer of the dissimilar material, the first layer of the resin-impregnated fibers interposed between and attached to each of the layer of stone-based material and the layer of the dissimilar material, and a third layer of the resin-impregnated fibers attached to the layer of dissimilar material.

3. The multilayer laminate panel of claim 1, having a symmetrical configuration comprising, in order, a third layer of the resin-impregnated fibers, a first layer of dissimilar material of the at least one layer of the dissimilar material, the second layer of the resin-impregnated fibers, a layer of stone-based material including the first layer of the stone-based material, a first layer of the resin-impregnated material, a second layer of dissimilar material of the at least one layer of the dissimilar material, and a fourth layer of the resin-impregnated fibers, wherein each layer is attached to a next in said order.

4. The multilayer laminate panel of claim 1, wherein the at least one layer of dissimilar material consists of the cork or the derivative of cork.

5. The multilayer laminate panel of claim 1, wherein the dissimilar material has a density of about 30 kg/m³ to about 1500 kg/m³, or about 100 kg/m³ to about 400 kg/m³.

6. The multilayer laminate panel of claim 1, wherein the dissimilar material has a compressive strength of about 0.1 MPa to about 1.0 MPa, or about 0.3 MPa to about 0.8 MPa.

7. The multilayer laminate panel of claim 1, wherein the dissimilar material has a tensile strength of about 0.4 MPa to about 0.9 MPa, or about 0.6 MPa to about 0.7 MPa.

8. The multilayer laminate panel of claim 1, wherein the dissimilar material has a thermal conductivity of about 0.030 W/mK to about 0.040 W/mK, or about 0.032 W/mK to about 0.036 W/mK.

9. The multilayer laminate panel of claim 1, wherein the thickness of the layer of the stone-based is about 2 mm to about 20 mm, or preferably about 2 mm to about 15 mm.

10. The multilayer laminate panel of claim 1, wherein a thickness of the at least one layer of dissimilar material is about 1 mm to about 20 mm, or about 5 mm to about 15 mm.

11. The multilayer laminate panel of claim 1, wherein fibers comprised in the resin-impregnated fibers are in a form of a woven fabric with warp and weft directions at approximately 90 degrees to one another, and
wherein a specific mass of the fabric ranges from about 50 g/m² to about 800 g/m².

12. The multilayer laminate panel of claim 1, wherein fibers comprised in the resin-impregnated fibers are in a form of a unidirectionally oriented or biaxially oriented fabric of glass fibers, and
wherein the fabric has a minimum specific mass of about 150 g/m².

13. The multilayer laminate panel of claim 1, wherein the stone-based material has a surface roughness (Ra) of from about 0.1 μm to about 30 μm.

14. The multilayer laminate panel of claim 1, which has a sound insulation index of greater than about 10 dB and a coefficient of heat transmission of less than about 5 W/m²K.

15. The multilayer laminate panel of claim 1, having a flexural strength which is about two times greater than a flexural strength of a stone slab of a same thickness as the stone-based material layer.

16. The multilayer laminate panel of claim 1, having an ultimate deflection of at least about twice that of a stone slab of a same thickness as the stone-based material layer, for a span length of about 250 mm.

17. The multilayer laminate panel of claim 1, which, following subjection to a deflection of approximately 90% of its ultimate deflection, regains at least about 88% of its original shape.

18. The multilayer laminate panel of claim 1, wherein the stone-based material comprises natural stone that includes one or more of limestones, marbles, granites including gneisses and pegmatites, schist rocks including slate and quartzite, and agglomerated stone.

19. A multilayer laminate panel, comprising:
a first layer of stone-based material, having a thickness from 2 mm to 50 mm, being stone or a stone derivative, and configured to be under compression when the panel is mechanically loaded from an exposed surface of the first layer and supported on two or more anchoring points;
a second layer of dissimilar material having a lower density than a density of the first layer, the second layer comprising cork or a derivative of cork, and having a thickness from 1 mm to 50 mm; and
at least two layers of resin impregnated fibers,
wherein a first fiber layer is positioned at an interface between the stone or the derivate stone material and the cork or the cork derivate layer,
wherein a second fiber layer is positioned on an exterior surface of the cork or the cork derivate layer,
wherein a resin is provided by fiber-containing reinforcement layers to attach layers of the multilayer laminate panel together to form a unitary panel structure,
wherein the panel has a maximum load at rupture of at least 20 times as compared to a same stone thickness, measured in accordance with ASTM C293,
wherein the first fiber layer is a multiaxial reinforcement fabric including glass fibers with a specific mass between 150 g/m² and 300 g/m² per orientation axis, and
wherein the second fiber layer comprises a woven fabric with a specific mass between 150 g/m² and 400 g/m².

20. The multilayer laminate panel according to claim 19, wherein the dissimilar material has a density of about 100 kg/m³ to 400 kg/m³ measured in accordance with ASTM C271.

* * * * *